US005641897A

United States Patent [19]

Schuman

[11] Patent Number: 5,641,897
[45] Date of Patent: *Jun. 24, 1997

[54] SCANNING APPARATUS LINEARIZATION AND CALIBRATION SYSTEM

[75] Inventor: Marc Robert Schuman, San Francisco, Calif.

[73] Assignee: Topometrix, Santa Clara, Calif.

[*] Notice: The term of this patent shall not extend beyond the expiration date of Pat. No. 5,469,734.

[21] Appl. No.: 560,827

[22] Filed: Nov. 20, 1995

Related U.S. Application Data

[63] Continuation of Ser. No. 357,133, Dec. 15, 1994, Pat. No. 5,469,734, which is a continuation of Ser. No. 979,762, Nov. 20, 1992, abandoned.
[51] Int. Cl.⁶ ............................................ H01J 37/00
[52] U.S. Cl. ............................................ 73/105
[58] Field of Search ............................ 73/105; 250/306, 250/307, 442.11; 310/317, 328, 346, 315, 314

[56] References Cited

U.S. PATENT DOCUMENTS 4,359,892  11/1982  Schnell et al. ............................ 73/105

OTHER PUBLICATIONS

Durig et al., "Near-Field optical scanning microscopy with tunnel-distance regulation", IBM J Res vol. 30 No. 5 Sep. 1986, pp. 478–483.

Primary Examiner—Robert Raevis
Attorney, Agent, or Firm—Fulwider Patton Lee & Utecht, LLP

[57] ABSTRACT

The scanning apparatus linearization and calibration system includes an electromechanical scanner having a sample stage portion, and a deflecting member, mounted between the scanning means and a fixed mounting member, that undergoes deflection in response to displacement of the scanner sample stage portion in at least one dimension of displacement. Strain gauges are mounted to the deflecting member for measuring the deflection of the deflecting member and for generating a deflection output signal indicative of an amount of deflection of the deflecting member, to provide a highly sensitive indication of actual displacement of the sample stage of the scanning apparatus. Control circuitry also provides for open loop displacement correction and for closed loop feedback correction of the position of the scanner sample stage.

18 Claims, 6 Drawing Sheets

SCANNING APPARATUS LINEARIZATION AND CALIBRATION SYSTEM

This is a continuation of application Ser. No. 08/357,133, filed Dec. 15, 1994, (now U.S. Pat. No. 5,469,734), which is a continuation of Ser. No. 07/979,762, filed Nov. 20, 1992, now abandoned.

BACKGROUND OF THE INVENTION

1. Field of the Invention

This invention relates generally to linearization and calibration of electromechanical scanning devices, and more particularly relates to an apparatus for position measurement of a sample scanning stage used with scanning microscopes and surface measurement systems.

2. Description of Related Art

Devices for producing precise linear, two or three dimensional motion have proven to be highly useful in scanning devices. In particular, electromechanical transducers such as piezoelectric ceramic actuators, which expand upon being subjected to an electrical potential, have been used for X-Y-Z positioners in scanning probe microscopes. Such piezoelectric ceramic materials have been combined in laminates, tubes, or stacks, to allow two-dimensional and even three-dimensional motion of the sample stages for such systems.

Piezoelectric ceramic actuators are electromechanical elements that undergo dimensional changes about a poling axis which has been formed in the material during the manufacturing process. When an electrical field is applied to the ceramic, the material generally expands about the poling axis and contracts perpendicular to the poling axis. However, the dimensional response of such piezoelectric materials to an applied voltage is not linear, and such materials commonly display varying degrees of hysteresis, creep, and a variable sensitivity to application of voltage. Hysteresis occurs due to a difference in dimensional changes in response to an applied voltage, depending upon whether the voltage is an increase or decrease from the previous applied voltage. Although the degree of hysteresis and non-linearity of response is less for hard piezoelectric materials (having a Curie temperature above 300° C., and producing smaller displacements) than for soft piezoelectric materials (having a Curie temperature below 200° C., and producing larger displacements), the hard piezoelectric material still typically has a degree of hysteresis on the order of 2%, and a deviation from linearity of about 1%. Creep is a phenomenon of temporary dimensional stabilization which occurs after application of a step change in voltage to cause an initial dimensional change, followed by a gradual, long term, small dimensional change in the direction of the initial change. The amount of creep for a piezoelectric material can range from 1% to 20% of the initial dimensional response over a period of about 10 to 100 seconds.

Scanning probe microscopes such as scanning force microscopes, also known as atomic force microscopes, are useful for imaging objects as small as atoms. The scanning force microscope is closely related to the scanning tunneling microscope and the technique of stylus profilometry. In a typical scanning force microscope, a laser beam is directed at a reflective portion of a lever arm carrying a probe so that a vertical movement of a probe following the contours of a specimen is amplified into a relatively larger deflection of the light beam. The deflection of the laser beam is typically monitored by a photodetector array in the optical path of the deflected laser beam, and the sample is mounted on a sample stage moveable in minute distances in three dimensions so that the sample can be raster scanned while the vertical positioning of the probe relative to the surface of the sample is maintained substantially constant by a feedback loop with the photodetector controlling the vertical positioning of the sample. Such scanning force microscopes are useful for imaging a sample which is moved in three dimensions while the sensor head is stationary and separate from the scanning assembly moving the sample. Alternative constructions in which the sample is held stationary while the probe is moved may also be used to accomplish essentially the same results.

Scanning force microscope images can be severely distorted due to problems of hysteresis, creep, and generally non-linear response of piezoelectric materials used in scanning devices for such microscopes. In view of the high resolution and positioning accuracy required to avoid distortions in scanning force microscope imaging, it would be desirable to provide an electromechanical scanning apparatus which insures precise translational motion of the scanning device and accurate measurement of the position of the probe relative to the sample.

Distortions in scanner displacement of an X-Y-Z scanner have been typically corrected by closed loop feedback correction or postimaging software, based upon determination of corrected (x,y) positions according to a formula with a number of variables, and various strategies for interpolation, or based upon measurements of the actual scanner displacement. Correction by postimaging software can be time consuming and require a high utilization of computing resources; and interpolation errors in the process can blur and distort the image. Linear-variable differential transformer, optical interferometry, capacitance, and optical beam position sensing methods have also been used for measuring actual scanner displacement. Interferometry has proven to be very accurate, but results in a periodic output function, and is complex to implement. A photoelectric differencing system, with a predetermined dynamic range, has also proven useful, but has a limited resolution capability. Strain gauges that change their electrical resistance with a change in length are sensitive indicators that can be bonded directly to piezoelectric actuators to give an indication of localized extension of the actuator, which can in turn be used to extrapolate approximate displacement of a stage. However, mounting the strain gauges directly on the ceramic does not work well when the scan range is greater than approximately 1 micron ($\mu$).

It would be desirable to provide an improved system for linearizing and calibrating non-linear electromechanical scanning devices having greater than $1\mu$ of extension, with improved linearity over conventional methods, thereby reducing problems of hysteresis, creep and non-linear displacement responses. It would also be desirable to provide such an improved system that is small and relatively inexpensive to manufacture. The present invention meets these needs.

SUMMARY OF THE INVENTION

Briefly and in general terms, the scanning apparatus linearization and calibration system according to the present invention provides for improved X-Y-Z positioning and imaging accuracy for high resolution microscopes and provides a means to reduce problems of hysteresis, creep, and non-linear sensitivity of scanner apparatus electromechanical actuators known in the art. The system of the invention provides an electromechanical scanning apparatus having a sample stage portion, a deflecting structure mounted between the scanning apparatus and the fixed mounting base so that the deflecting structure undergoes deflection in response to displacement of the scanning apparatus portion in at least one dimension of displacement, and means for measuring the deflection of the deflecting structure and for generating a deflection output signal indicative of an amount of deflection of the deflecting structure. In a preferred embodiment, strain gauges are mounted to the deflecting structure to provide a highly sensitive indication of actual displacement of the sample stage of the scanning apparatus, for improved linearity and calibration, with a greater dynamic range than heretofore provided by conventional methods. The improved scanning apparatus linearization and calibration system of the present invention is also small and relatively inexpensive to manufacture and does not substantially complicate the construction of the scanning system.

In a currently preferred embodiment of the invention, the apparatus provides a scanning apparatus linearization and calibration system comprising a fixed mounting base, and scanning means having a scanning probe apparatus suitable for use with a scanning force microscope or scanning tunnelling microscope. The scanning probe apparatus is mounted to the fixed mounting means for displacement in at least one dimension of displacement relative to the fixed mounting base. In one preferred embodiment, the scanning apparatus comprises a translation stage tower mounted to the fixed mounting base for pivotal movement, and in a second preferred embodiment, the scanning apparatus comprises a piezoelectric tube scanner mounted to the fixed mounting base. A control system is also provided for generating a command signal for a desired displacement of the scanning apparatus in at least one dimension of displacement. In preferred embodiments, the control system generates a plurality of command signals for desired displacement of the scanning apparatus in two or three dimensions of displacement. An electromechanical actuator electrically connected to the control system is mounted to the fixed mounting base for displacing the scanning apparatus sample stage portion in up to three dimensions of displacement relative to the fixed mounting base responsive to command signals. A deflecting member such as a beam is mounted between the scanning apparatus and the fixed mounting base and undergoes deflection corresponding to displacement of the scanning apparatus sample stage portion in at least one dimension of displacement.

In one preferred embodiment, first and second deflecting members are mounted between the scanning apparatus and the fixed mounting base. Means are also provided for measuring the deflection of the deflecting member and for generating a deflection output signal indicative of an amount of deflection of the deflecting member, and in a preferred embodiment, the means for measuring the deflection comprises at least one strain gauge mounted to the deflecting member for producing an electrical signal indicative of the amount of deflection of the deflecting member. In a preferred implementation, at least one set of first and second strain gauges are mounted on opposing sides of a deflecting beam for producing first and second electrical signals indicative of the amount of deflection. The first and second electrical signals are preferably connected to a differential amplifier having an output proportional to the actual displacement of the scanning apparatus relative to the fixed mounting member from a position in which the deflecting beam is undeflected, or from a position in which the displacement of the sample stage is substantially zero, where the deflecting member is prestressed to a slight degree. The strain gauges are also preferably connected in a temperature compensated bridge configuration. Means are provided for determining an actual displacement of the scanning apparatus sample stage in at least one displacement dimension electrically connected to the means for measuring the deflection based upon the output deflection signal, and for determining a displacement correction in at least one dimension of displacement by comparing the desired displacement with the actual displacement. In a preferred embodiment, the scanner apparatus linearization and calibration system includes closed loop feedback control means for integrating the displacement correction to provide an integrated displacement correction signal, and means for modifying the command signal with the integrated displacement correction signal to produce the desired displacement of the scanning means.

In a presently preferred embodiment, the method of the invention involves inputting a signal to one or more piezoelectric actuators which has been predetermined to drive the actuator to a desired location, thus positioning the sample stage attached to the actuator. The actuator is also connected to a deflecting member, such as a beam, which is also attached to a base member. One or more strain gauges are mounted on the deflecting member to provide an output proportional to the strain on the surface of the deflecting member and thus related to the displacement of the deflecting member. The output of the strain gauge(s) may be used as a feedback signal to correct the input signal to the piezoelectric stack, or as a direct readout of displacement for one or more axes.

In another preferred embodiment of the invention, the measurement probe is scanned relative to the sample, which may also be either capable of being scanned or fixed. In such an embodiment, the deflecting member such as a beam or resilient element or structure is mounted between the probe and a fixed base and is equipped with one or more strain gauges to measure the deflection of the deflecting member. The output of the strain gauges may be used to measure the position of the probe and also may be used as an input to control the movement of the probe by a feedback control system driving the probe displacement actuators.

From the above, it may be seen that the present invention represents a substantial improvement in the ability to measure the position of probes in scanning probe systems without substantially increasing the cost or complexity of the scanning system. Other aspects and advantages of the invention will become apparent from the following detailed description, and the accompanying drawings, which illustrate, by way of example, the features of the invention.

DETAILED DESCRIPTION OF THE PREFERRED EMBODIMENTS

Figure 1:
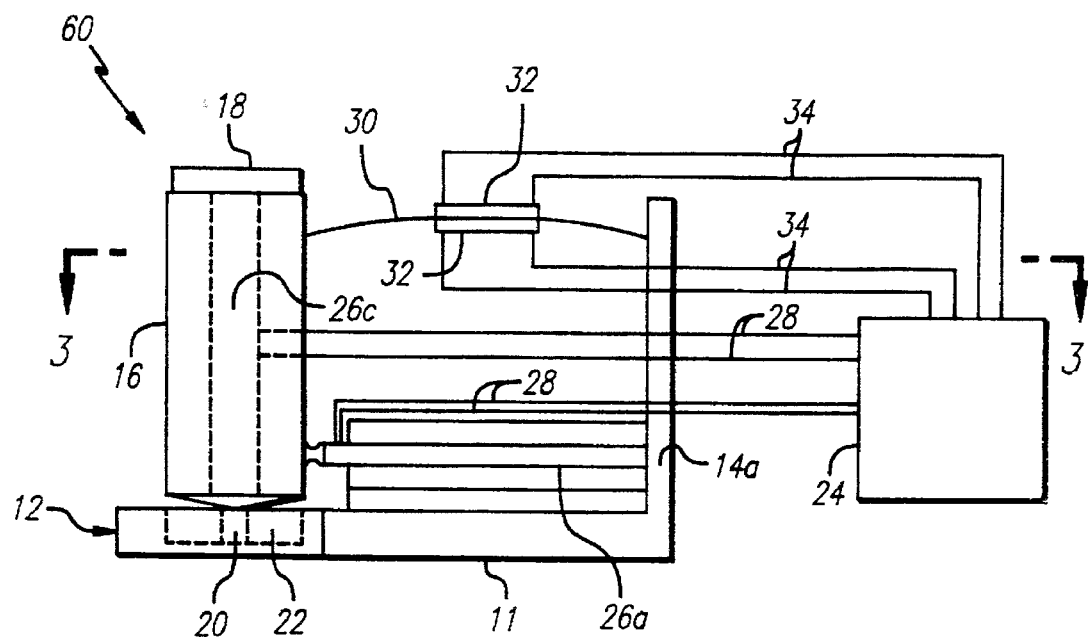
FIG. 1 is a side elevational view of the scanning apparatus linearization and calibration system of one embodiment of the invention.

As is shown in the drawings, which are included for purposes of illustration, but not by way of limitation, the invention is embodied in an electromechanical scanning apparatus linearization and calibration system such as is suitable for positioning a sample stage such as may be used with high resolution microscopes such as scanning force microscopes or scanning tunneling microscopes, or the like, in up to three dimensions, for relative positioning of a sample stage relative to a sensor probe of the microscope. Such microscopes are useful for imaging objects as small as atoms, so that there is a need for a stable translational positioning apparatus capable of positioning an object with extremely high resolution in up to three dimensions with a minimum of linear or rotational error.

Figure 2:
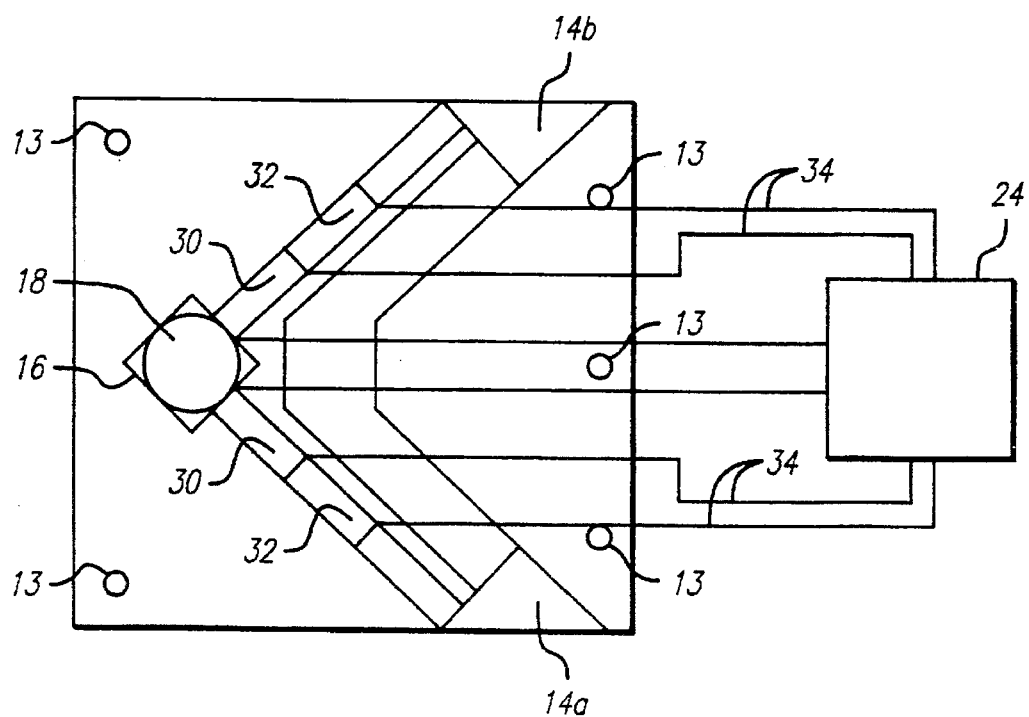
FIG. 2 is a top plan view of the system shown in FIG. 1, rotated 45° clockwise.
Figure 3:
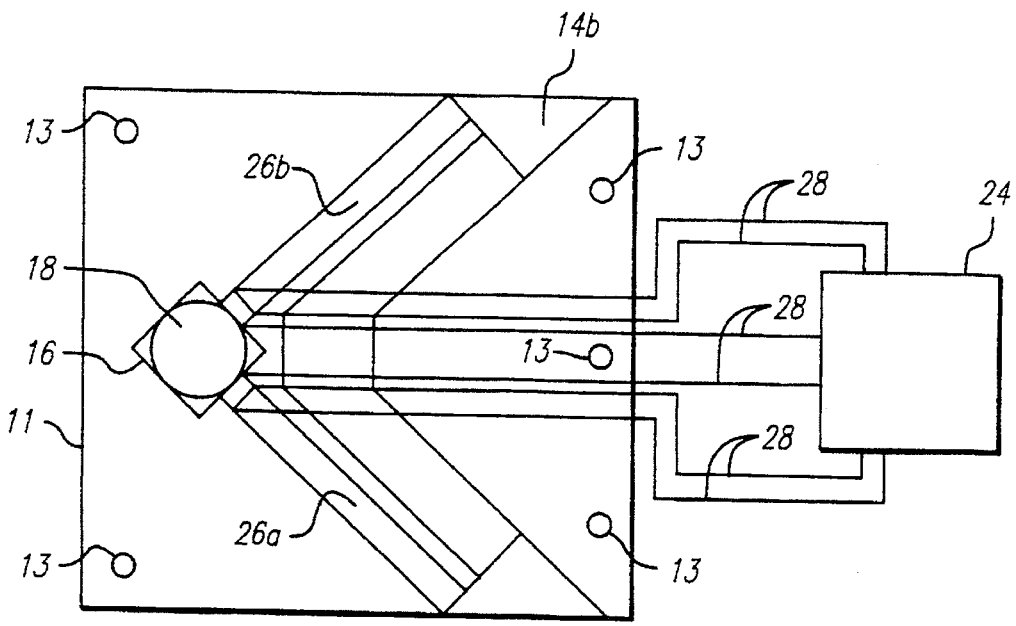
FIG. 3 is a cross-sectional view of the system of the invention taken along line 3—3 of FIG. 1, rotated 45° clockwise.

With reference to FIGS. 1–3, in one preferred embodiment, the scanning apparatus linearization and calibration system 10 includes a flat planar base member 12, having a bottom portion 11 with mounting holes 13 for mounting of the base member to a platform (not shown) for the scanning apparatus. The base member includes fixed mounting wall plates 14a extending perpendicular to the bottom portion of the base member. A pivoting scanning tower 16 with a sample stage 18 at one end is mounted to the base member for pivotal movement relative to the base member, preferably by a threaded bolt connection 20, extending through a pivot well portion 22 in the bottom portion of the base member. The sample stage may comprise a magnetic material, to allow a specimen to be mounted by adhesion onto a small magnetic steel plate which can thus be magnetically secured on the top of the stage, allowing for the convenient interchange of specimens to be examined by the instrument.

A control unit 24 is electrically connected to electromechanical actuators 26a,b,c for pivotally translating the sample stage of the scanning tower in x and y dimensions of a horizontal plane, and for vertically controlling the position of the sample stage in a z dimension, respectively, via control lines 28. The control unit preferably generates command signals for driving the electromechanical actuators in all three dimensions for linear, or two or three dimensional translation of the sample stage. The electromechanical actuators preferably comprise piezoelectric ceramic actuators which expand upon being subjected to an electrical current, typically formed of piezoelectric ceramic materials that have been combined in laminates or stacks. Actuators 26a and 26b are preferably mounted at right angles to each other between the fixed mounting wall plate of the base member and the scanning tower control the pivotal, as is best seen in FIG. 3, for translation of the sample stage in the horizontal orthogonal x and y dimensions. The actuator 26c is preferably mounted within the pivoting scanning tower between the base of the scanning tower and the sample stage, for raising the sample stage vertically in a z direction orthogonal to the x and y dimensions.

A pair of deflecting members 30 are preferably mounted between the scanning tower and the fixed mounting wall plate above the electromechanical actuators to undergo deflection in response to and corresponding to displacement of the sample stage of the scanning tower in the horizontal x and y dimensions of displacement. In one preferred embodiment, each deflecting member comprises an elongated beam mounted between the fixed mounting wall plate and the pivoting scanning tower, although the deflecting member can alternatively comprise other deflectable material and configurations, such as an elastic structure, or the like. The deflecting members are also preferably prestressed to have a slight degree of curvature in an initial position in which the scanning tower and sample stage have undergone substantially zero displacement by the electromechanical actuators.

At least one strain gauge 32 of the type known in the art, such as thin semiconductor or thin metal film strain gauges having a resistance that changes in proportion to their change in length, is mounted on each of the deflecting members, for producing an electrical signal indicative of the amount of deflection of the deflecting members. Two sets of strain gauges are preferably mounted in pairs on opposing sides of each of the deflecting members, for producing first and second electrical output deflection signals corresponding to each of the x and y dimensions, indicative of the amount of deflection of the deflecting members, and thereby the amount of displacement of the sample stage in the x and y dimensions. The strain gauges are electrically connected by lines 34 to the control unit for measuring resistance of strain gauges for determining deflection of the deflecting members. The output deflection electrical signals from the pairs of strain gauges are preferably received by a differential amplifier having a differential output deflection signal proportional to the actual displacement of the scanner sample stage relative to the fixed mounting member from a position in which the deflecting member is undeflected, or from a position in which the displacement of the sample stage is substantially zero, where the deflecting member is prestressed with a slight degree of curvature. Since such strain gauges are also very sensitive to changes in temperature, the strain gauges are also preferably connected in a temperature compensated bridge configuration. Alternatively, it would also be possible to mount an intermediate deflecting member with strain gauges attached between each electromechanical actuator and the pivoting scanner tower, since the amount of displacement of the scanner sample stage can be correlated with the amount of deflection of such an intermediate deflecting member, provided the strain gauges are sufficiently sensitive.

Figure 4:
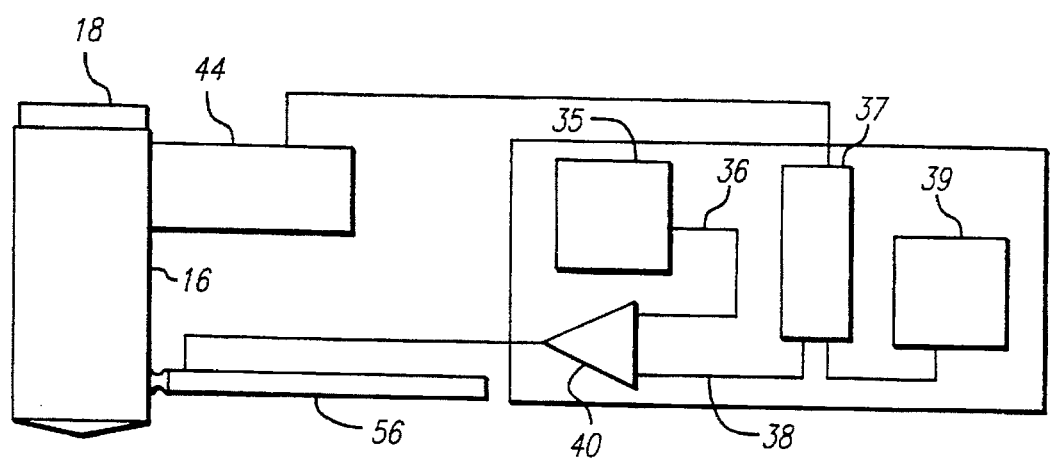
FIG. 4 is a simplified schematic diagram of the closed loop feedback control system of the invention.

The control unit preferably includes a scan generator circuit 35 to generate a command signal 36 for driving each of the electromechanical actuators. The control unit also preferably includes means for determining an actual displacement of the scanning means sample stage in at least one displacement dimension, such as an output deflection signal to voltage converter 37 electrically connected to the strain gauges for receiving the electrical output deflection signals, to output a position correction signal 38, representing the actual displacement of the scanner sample stage. The position correction signal can be received directly by a memory means 39 for recording the actual (x,y) positions of the scanner sample stage along with the readings of the microscope instrument at those positions, for linearization of image data by postimaging correction techniques, or for calibration of commanded positions by the recorded actual (x,y) positions of the scanner for future scans, according to conventional techniques. In an alternative preferred embodiment illustrated in FIG. 4, a differential amplifier 40 can be electrically connected to receive the position command signal 36 and the actual position correction signal 38 to output a corrected command signal to the electromechanical actuators in a closed feedback loop configuration.

Figure 5:
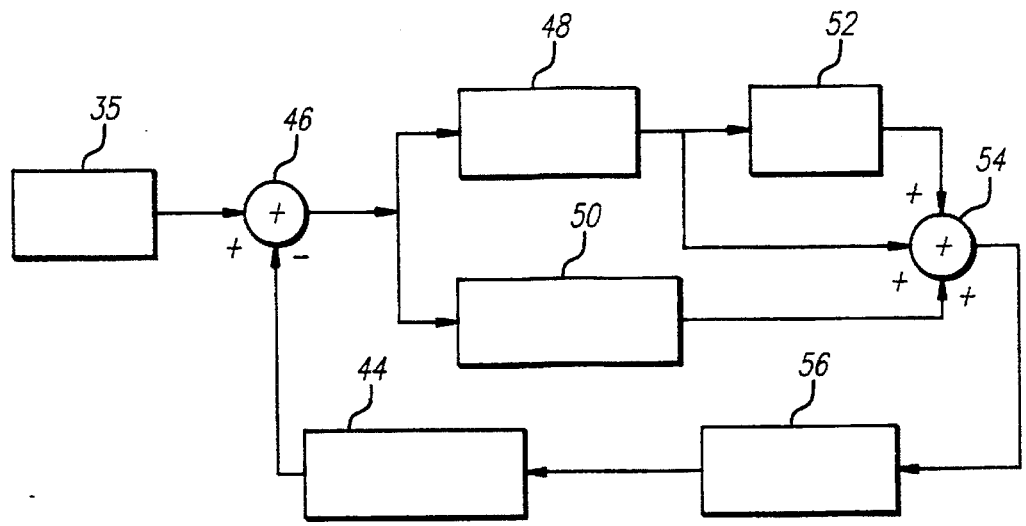
FIG. 5 is a schematic diagram of an integral feedback loop of the closed loop feedback control system of FIG. 4.

An alternate form of a closed feedback loop configuration is also illustrated in FIG. 5, in which the output of the scan generator 35 of the control unit and the output of position sensors 44 are summed at summing junction 46, to provide a summed signal received by a first integrator 48 and a differentiator 50. The output of the first integrator 48 is received by a second integrator 52 and summing junction 54, which also receives output from the second integrators 52 and the differentiator 50, to provide closed loop, double integration feedback to the electromechanical actuator 56.

Figure 6:
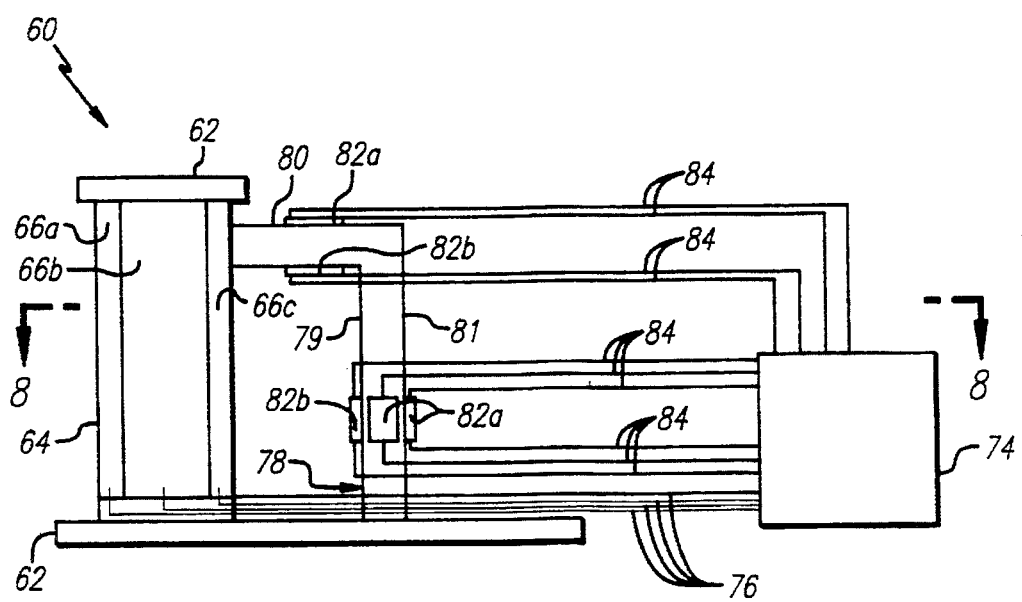
FIG. 6 is a side elevational view of an alternate embodiment of the scanning apparatus linearization and calibration system of the invention.
Figure 7:
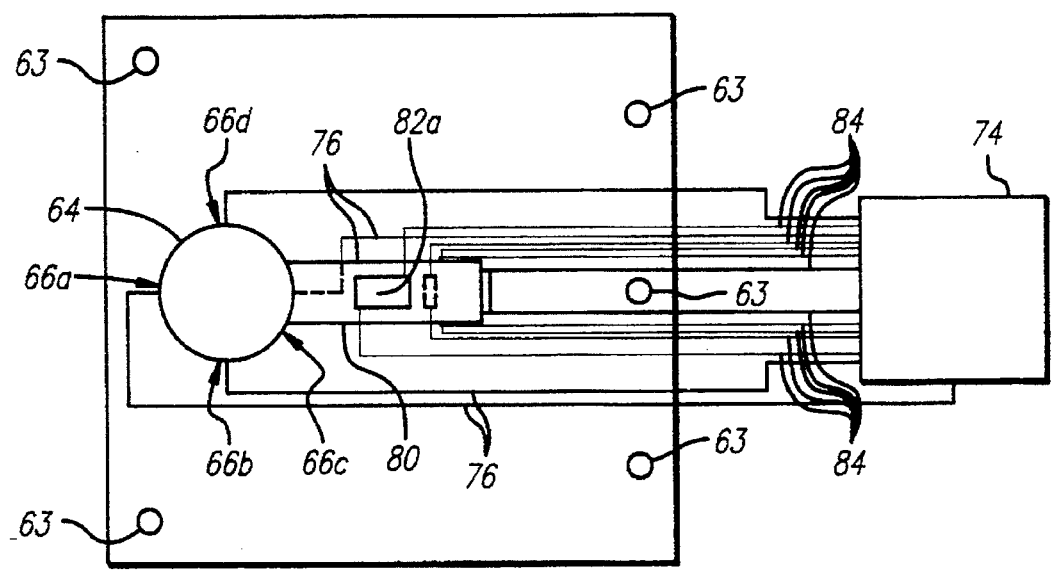
FIG. 7 is a top plan view of the system shown in FIG. 6.
Figure 8:
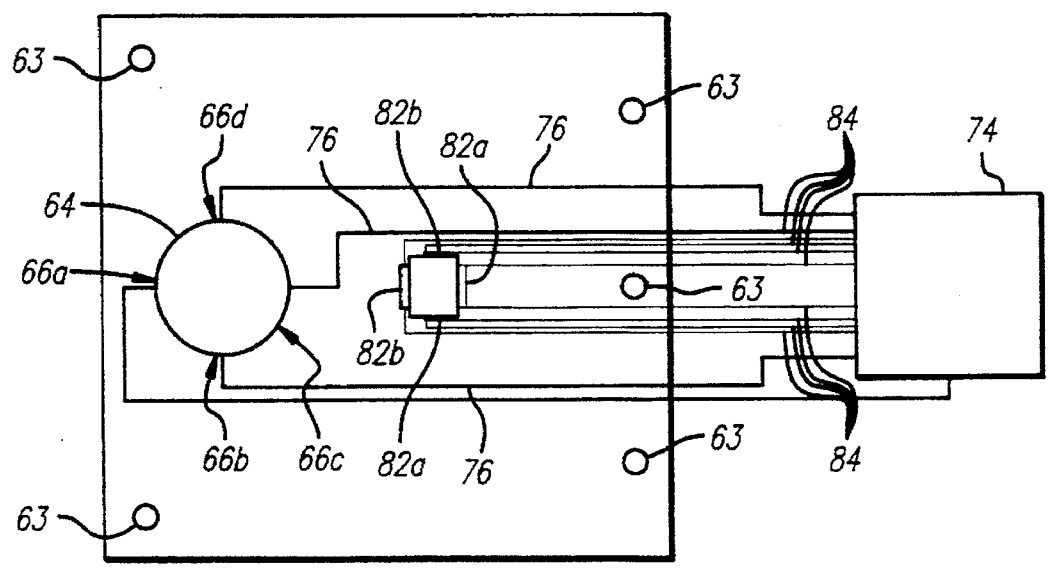
FIG. 8 is a cross-sectional view of the system of the invention taken along line 8—8 of FIG. 6.

An alternate preferred embodiment of the invention is shown in FIG. 6–8, illustrating a tube scanner linearization and calibration system 60. The system 60 includes a flat planar base member 12 with mounting holes 63 for fixedly mounting the base member to a platform (not shown) for the scanning apparatus. A scanning x-y tube, or tube scanner 64 preferably includes four vertical, individually actuatable electromechanical segments 66abcd formed of piezoelectric material, and is mounted to the base at its lower end. The tube scanner includes a sample stage 68 at the upper end, which can be displaced horizontally in orthogonal x and y dimensions by tilting of the tube scanner, and extended vertically in the z dimension orthogonal to the x and y dimensions, by controlled actuation of the individual segments. The sample stage may comprise a magnetic material, to allow a specimen to be mounted by adhesion onto a small magnetic steel plate which can thus be magnetically secured on the top of the stage, allowing for the convenient interchange of specimens to be examined by the instrument.

A control unit 74 is electrically connected to the electromechanical actuator segments 66abcd for translating the sample stage of the scanning tower in x and y dimensions of a horizontal plane, and for vertically controlling the position of the sample stage in a z dimension, respectively, via control lines 76. The control unit preferably generates command signals for driving the electromechanical actuator segments to control the positioning of the sample stage in all three dimensions for linear, or two or three dimensional translation of the sample stage.

Figure 10:
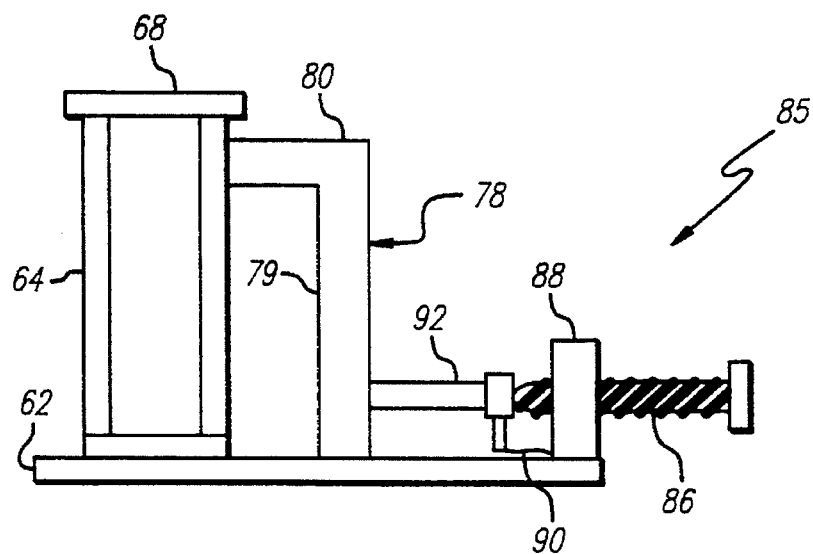
FIG. 10 is an elevational view of the system of FIGS. 6–8 with an adjustable tensioner device.

A right angle deflecting member 78 having a first elongated upright portion 79 and a crossbar portion 80 extending at right angles to the upright portion is preferably mounted to the base member at the bottom end of the upright portion and mounted to the tube scanner at the upper end of the crossbar portion. The right angle deflecting member is preferably formed of elongated deflectable plastic or elastic material, and has orthogonal faces for mounting of at least individual strain gauges, and preferably strain gauge pairs 82ab on opposing sides of the deflecting member, as described earlier. The strain gauge pairs are preferably mounted on the four orthogonal faces of the upright portion of the deflecting member for detecting displacement of the scanner sample stage horizontally in x and y dimensions, and are mounted on upper and lower faces of the upper crossbar member for detecting displacement of the sample stage vertically in the z dimension. The right angle deflecting member is also preferably prestressed during mounting to the base and scanner to have a slight degree of tension in an initial position in which the scanning tower and sample stage have undergone substantially zero displacement. It should be noted that this arrangement of the right angle deflecting member and strain gauges can also be used interchangeably with the deflecting member and strain gauge configuration illustrated in FIGS. 1–3 for measuring actual displacement of the pivoting scanner sample stage. An optional adjustable tensioner means 85 may also be mounted to the base member adjacent to the right angle deflecting member as is illustrated in FIG. 10, for adjusting the stressing and deflection of the deflecting member, for minor adjustments of the displacement measurements of the sample stage. Such a tensioner means may, for example, include a thumbscrew 86 mounted by a bracket 88 to the base member. The thumbscrew can be either disposed directly adjacent to the deflecting member abutting against it, or can operate to press against the deflecting member through an intermediate element. Such an intermediate element can be mounted by a spring element 90 to the bracket or to the base to allow for a limited range of movement of the intermediate element, with a connecting drive member 92 connected to the spring element and abutting against the deflecting member.

As related earlier with regard to FIGS. 1–3, in the embodiment illustrated in FIGS. 6–8, the strain gauges are electrically connected by lines 84 to the control unit for measuring resistance of strain gauges for determining deflection of the deflecting members. The output deflection electrical signals from the pairs of strain gauges are preferably received by a differential amplifier having a differential output deflection signal proportional to the actual displacement of the scanner sample stage relative to the fixed mounting member from a position in which the deflecting means is undeflected, or from a position in which the displacement of the sample stage is substantially zero, where the deflecting member is prestressed with a slight degree of curvature. Since such strain gauges are also very sensitive to changes in temperature, the strain gauges are also preferably connected in a temperature compensated bridge configuration.

Figure 9:
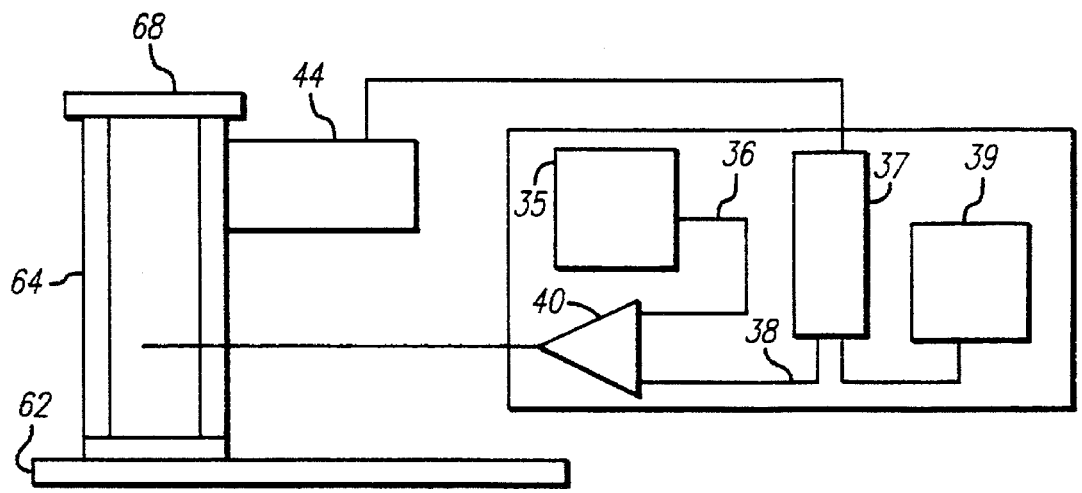
FIG. 9 is a simplified schematic diagram of the closed loop feedback control system of the invention for use with a tube scanner.

As with the embodiment of FIGS. 1–3, in the embodiment of FIGS. 6–8, and as is illustrated in FIG. 9, the control unit 74 preferably includes a scan generator circuit 35 to generate a command signal 36 for driving each of the electromechanical segments of the tube scanner. The control unit also preferably includes means for determining an actual displacement of the tube scanner sample stage in at least one displacement dimension, such as the output deflection signal to voltage converter 37 electrically connected to the strain gauges for receiving the electrical output deflection signals, to generate a position correction signal 38, representing the actual displacement of the scanner sample stage. The position correction signal can be received directly by a memory means 39 for recording the actual (x,y) positions of the scanner sample stage along with the readings of the microscope instrument at those positions, for linearization of image data by postimaging correction techniques, or for calibration of commanded positions by the recorded actual (x,y) positions of the scanner for future scans, according to conventional techniques, as described earlier. In the preferred embodiment illustrated in FIG. 9, corresponding to FIG. 4 described earlier, a differential amplifier 40 can be electrically connected to receive the position command signal 36 and the actual position correction signal 38 to output a corrected command signal to the electromechanical actuators in a closed feedback loop configuration.

An alternate form of a closed feedback loop configuration for use with the tube scanner of FIGS. 6–8 is as described and illustrated with regard to FIG. 5.

The scanner linearization and calibration system of the invention is advantageous in that it can be small and relatively inexpensive to manufacture, and in that it is also possible to achieve an improved sample stage positioning and imaging accuracy of one part in 100,000, which is an improvement of at least an order of magnitude over the degree of positioning and imaging accuracy heretofore possible with conventional linearization and calibration systems.

While the system and method of the present invention have been described in their application to the measurement of displacement of a scanning member containing a specimen to be scanned by a fixed probe, it is also apparent that the invention may be applied to measurement of displacement of a moveable probe as well. In a scanning instrument incorporating such a probe, the probe is mounted in a moveable carrier analogous to the arrangement illustrated in FIGS. 1–8, with the position of the scanning sample stage 18 taken by a probe mounting means. Such a probe scanning apparatus could be either arranged to scan a sample stage mounted in a fixed fashion to a base member, or in opposition to a scanning stage of the type illustrated in FIGS. 1–8.

More particularly, such an arrangement allows for greater flexibility in the range and types of scanning that may be accomplished and the invention offers particular advantages for such an arrangement by providing increased measurement accuracy over other methods, thus minimizing the errors inherent in the use of piezoelectric actuators when multiple sets of such actuators are used to create relative displacement between sample and probe. FIG. 10 is an illustration of a perspective view of such an arrangement, showing the piezoelectric stacks and deflecting members for the two opposing stages. While a particular arrangement has been illustrated, those skilled in the art will recognize that other arrangements of actuators and deflecting members providing relative motion between the probe and sample, are contemplated by the invention.

Figure 11:
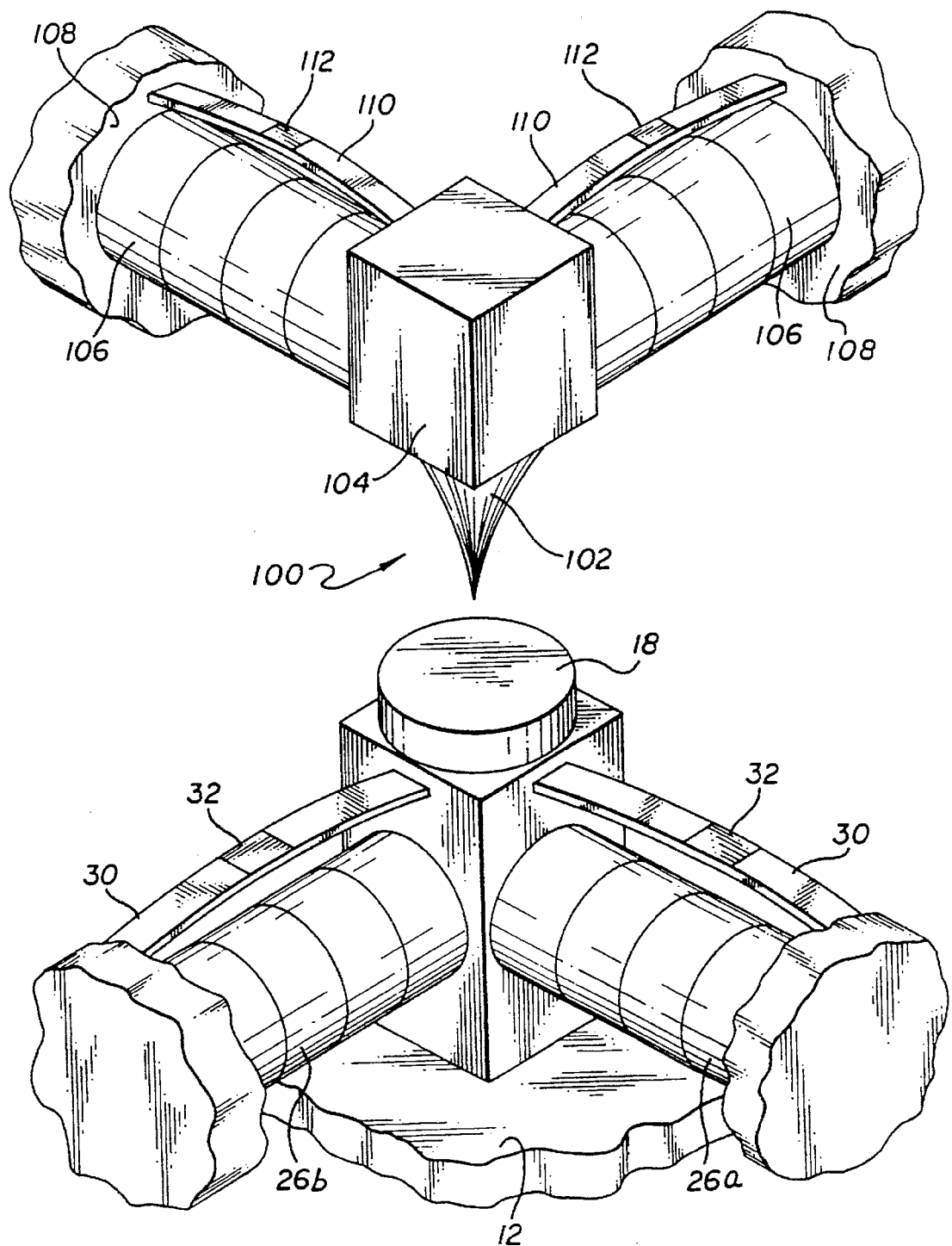
FIG. 11 is a perspective view of an arrangement in which the invention is used on both a scanning stage and probe motion actuator.

Referring to FIG. 11, sample stage 18 is mounted on a scanning tower 16 pivotally attached to a fixed base 12. Piezoelectric actuators 26 are used to move the sample stage relative to the base. Deflecting members 30, in this case beams, are mounted between the fixed base and the scanning tower 16, and thereby deflect in response to movement of the tower, and thus the sample stage. Straining gauges 32 are mounted on deflecting members 30 to provide an output indicating the displacement of the sample stage 18.

Similarly, probe stage 100 contains a probe 102 mounted in a probe holder 104 driven in at least one axis by actuators 106 mounted between a fixed base 108 and the probe holder 104. In a fashion similar to the previously described sample stage actuator and measurement system, deflecting members 110 are mounted between base 108 and holder 104 and equipped with strain gauges 112 to provide an independent measurement of the position of probe holder 104 and thus probe 102.

For the sake of clarity, no actuators and deflecting members are illustrated to operate the probe holder 104 or sample stage 18 in directions octagonal to the plane of the actuators illustrated. In practise, it is contemplated that one more such actuators and deflecting members would be attached between said stages and probe holding to facilitate vertical motion between said probe 102 and said sample stage 18 to perform the measurements required of the instrument.

It should be evident that it would be possible to mount deflecting members opposite electromechanical actuators for measuring displacement of a sample stage of a pivot type scanner. It would also be possible to mount a leaf spring deflecting member to a fixed mounting plate, with opposing strain gauges attached, with the other end of the leaf spring mounted at right angles to an intermediate solid connecting member mounted to the pivot tower, for either a pivot scanner or tube scanner embodiment. An upright deflecting member with opposing strain gauges attached could also be connected to a pivot scanner or tube scanner for measuring displacement of a sample stage. It would also be possible to mount strain gauges to the electromechanical actuators of the pivoting scanner or the electromechanical segments of the tube scanner, or to other types of deflecting elements mounted on or adjacent to the scanner apparatus in configurations similar to those described, to detect displacement of the scanner sample stage in three dimensions.

It will be readily apparent from the foregoing that while particular forms of the invention have been illustrated and described, various modifications can be made without departing from the spirit and scope of the invention. Accordingly, it is not intended that the invention be limited, except as by the appended claims.

We claim:

1. A system for linearization and calibration of an electromechanical scanning apparatus for scanning topography of a sample, said system comprising:

a fixed mount;

a scanner mounted for displacement of said scanner relative to said fixed mount;

a controller connected to said scanner for generating a command signal for a desired displacement of said scanner;

a deflecting member mounted between said scanner and said fixed mount adapted to undergo deflection in response to displacement of said scanner;

means attached to said deflecting member for measuring said deflection of said deflecting member and for generating an output deflection signal indicative of an amount of deflection of said deflecting member; and closed loop feedback control means for providing a control signal to said scanner derived from said output deflection signal and said command signal.

2. The system of claim 1, wherein said means for measuring said deflection comprises a strain gauge mounted to said deflecting member for producing an electrical signal indicative of the deflection of said deflecting member.

3. The system of claim 1, wherein said means for measuring said deflection comprises a plurality of pairs of strain gauges mounted on opposing sides of said deflecting member, each of said pairs of strain gauges producing first and second electrical signals indicative of said amount of deflection due to said displacement, and wherein said first and second electrical signals are connected to a differential amplifier having an output proportional to the actual displacement of said scanner relative to said fixed mount from an initial position.

4. The system of claim 1, wherein said deflecting member is formed in a right angle and mounted between said scanner and said fixed mount, and said means for measuring said deflection comprises first, second and third pairs of strain gauges mounted on opposing sides of said deflecting member, each of said pairs of strain gauges producing first and second electrical signals indicative of said amount of deflection of said deflecting member, and wherein each of said first and second electrical signals are connected to a differential amplifier having an output proportional to the actual displacement of said scanner in two degrees of freedom relative to said fixed mount from a position in which the displacement of the scanner is substantially zero and an output in one degree of freedom proportional to the topography of the sample.

5. The system of claim 1, further comprising means for determining an actual displacement of said scanner based upon said output deflection signal, wherein said closed loop feedback control means integrates said actual displacement to provide an integrated displacement correction signal, and further comprising means for modifying said command signal with said integrated displacement correction signal to produce said desired displacement of said scanner.

6. The system of claim 1, further comprising an electromechanical actuator electrically connected to said controller and mounted to said fixed mount for displacing said scanner relative to said fixed mount in response to said command signal.

7. A system for linearization and calibration of an electromechanical scanning apparatus for scanning topography of a sample, said system comprising:

a microscope for producing image data of a sample;
a fixed mount for mounting said microscope;
a sample stage for said sample;
a scanner mounted for displacement of said sample stage relative to said microscope;
a deflecting member mounted between said scanner and said fixed mount adapted to undergo deflection in response to displacement of said scanner;
means attached to said deflecting member for measuring said deflection of said deflecting member and for generating an output deflection signal indicative of an amount of deflection of said deflecting member; and
means for correcting distortions in said image data based upon said output deflection signal.

8. The system of claim 7, wherein said means for measuring said deflection comprises at least one strain gauge mounted to said deflecting means for producing an electrical signal indicative of the deflection of said deflecting member.

9. The system of claim 7, wherein said means for measuring said deflection comprises a plurality of pairs of strain gauges mounted on opposing sides of said deflecting member, each of said pairs of strain gauges producing first and second electrical signals indicative of said amount of deflection due to said displacement, and wherein said first and second electrical signals are connected to a differential amplifier having an output proportional to the actual displacement of said scanner relative to said fixed mount from an initial position.

10. The system of claim 7, wherein said deflecting member is formed in a right angle and mounted between said scanner and said fixed mount, and said means for measuring said deflection comprises first, second and third pairs of strain gauges mounted on opposing sides of said deflecting member, each of said pairs of strain gauges producing first and second electrical signals indicative of said amount of deflection of said deflecting member, and wherein each of said first and second electrical signals are connected to a differential amplifier having an output proportional to the actual displacement of said scanner in two degrees of freedom relative to said fixed mount from a position in which the displacement of the scanner is substantially zero and an output in one degree of freedom proportional to the topography of the sample.

11. The system of claim 7, wherein said means for correcting distortions in said image data comprises:

means for determining actual displacement positions of said scanner based upon said output deflection signal; and
memory means for receiving said actual displacement positions and storing said actual displacement positions along with said image data of said microscope at said actual displacement positions for linearization of said image data.

12. The system of claim 7, further comprising a controller connected to said scanner for generating a command signal for a desired displacement of said scanner, and an electromechanical actuator electrically connected to said controller and mounted to said fixed mount for displacing said scanner relative to said fixed mount in response to said command signal.

13. A method for linearization and calibration of an electromechanical scanning apparatus for scanning a sample stage for a sample relative to a microscope, said scanning apparatus including a fixed mount for mounting said microscope, a scanner mounted for displacement of the scanner relative to said fixed mount, a deflecting member mounted between said scanner and said fixed mount, and means for measuring deflection of the deflecting member, the steps of the method comprising:

scanning said sample stage relative to said microscope;
generating a command signal for scanning said sample stage a desired displacement;
displacing said sample stage relative to said microscope in response to said command signal;
measuring said deflection of said deflecting member and generating an output deflection signal indicative of an amount of deflection of said deflecting member; and
providing a closed loop feedback control signal to said scanner derived from said output deflection signal and said command signal.

14. The method of claim 13, further comprising the steps of determining an actual displacement of said scanner based upon said output deflection signal, integrating said actual displacement to provide an integrated displacement correction signal, and modifying said command signal with said integrated displacement correction signal to produce said desired displacement of said scanner.

15. The method of claim 13, wherein said means for measuring said deflection comprises a strain gauge mounted to said deflecting member for producing an electrical signal indicative of the deflection of said deflecting member, said scanner further comprises a probe for scanning the topography of the sample, and wherein the output of said strain gauge is used to measure the position of the probe over the sample.

16. A method for linearization and calibration of an electromechanical scanning apparatus, said electromechanical scanning apparatus including a microscope for producing image data of a sample, a fixed mount for mounting said microscope, a sample stage for said sample, a scanner mounted for displacement of said sample stage relative to said microscope, and a deflecting member mounted between said scanner and said fixed mount, the steps of said method comprising:

generating a command signal for a desired displacement of said scanner;

displacing said scanner relative to said fixed mount in response to said command signal;

measuring said deflection of said deflecting member and generating an output deflection signal indicative of an amount of deflection of said deflecting member; and correcting distortions in said image data based upon said output deflection signal.

17. The method of claim 16, wherein said step of correcting distortions in said image data comprises:

determining actual displacement positions of said scanner based upon said output deflection signal; and linearizing said image data based upon said actual displacement positions.

18. The method of claim 16, wherein said scanner further comprises a probe for scanning the topography of the sample, and wherein output deflection signal is used to measure the position of the probe over the sample.

\* \* \* \* \*